Nov. 11, 1952 A. LEVIT 2,617,460
MEAT-CUTTING MACHINE
Filed July 1, 1949 3 Sheets-Sheet 1
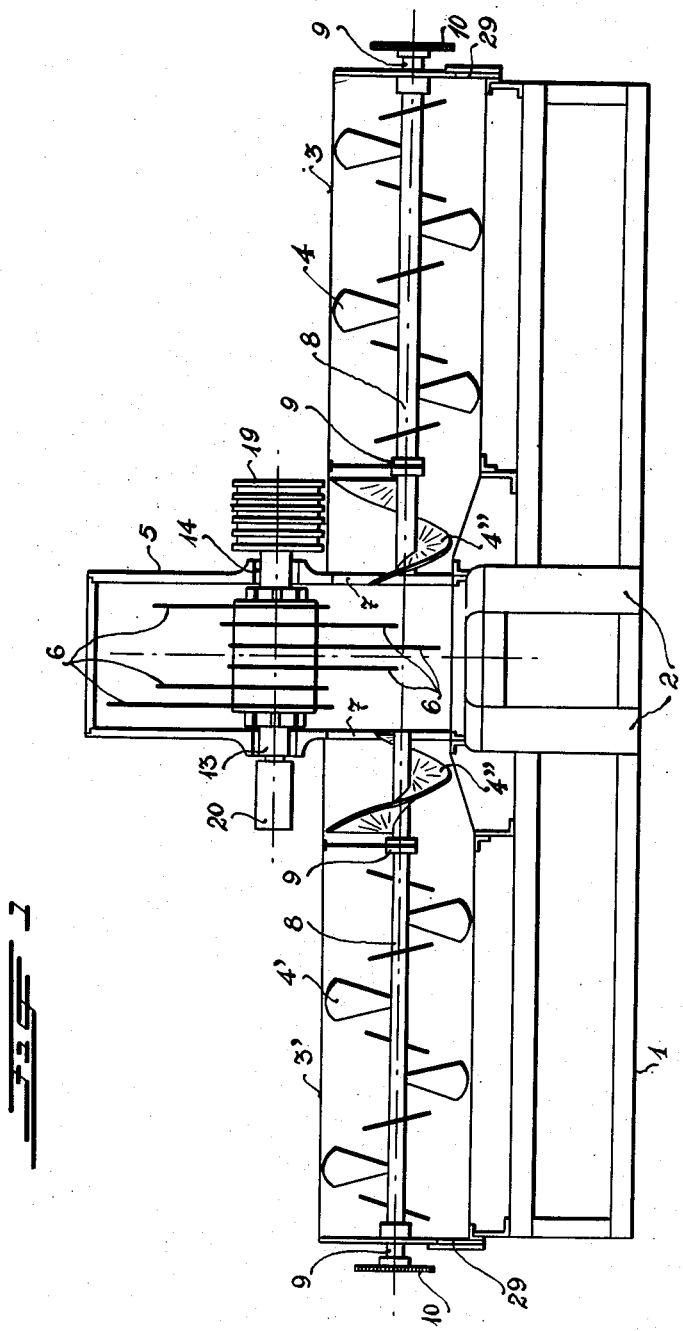
INVENTOR.
Adolfo Levit
BY
ATTORNEY.

Nov. 11, 1952  A. LEVIT  2,617,460
MEAT-CUTTING MACHINE
Filed July 1, 1949  3 Sheets—Sheet 2
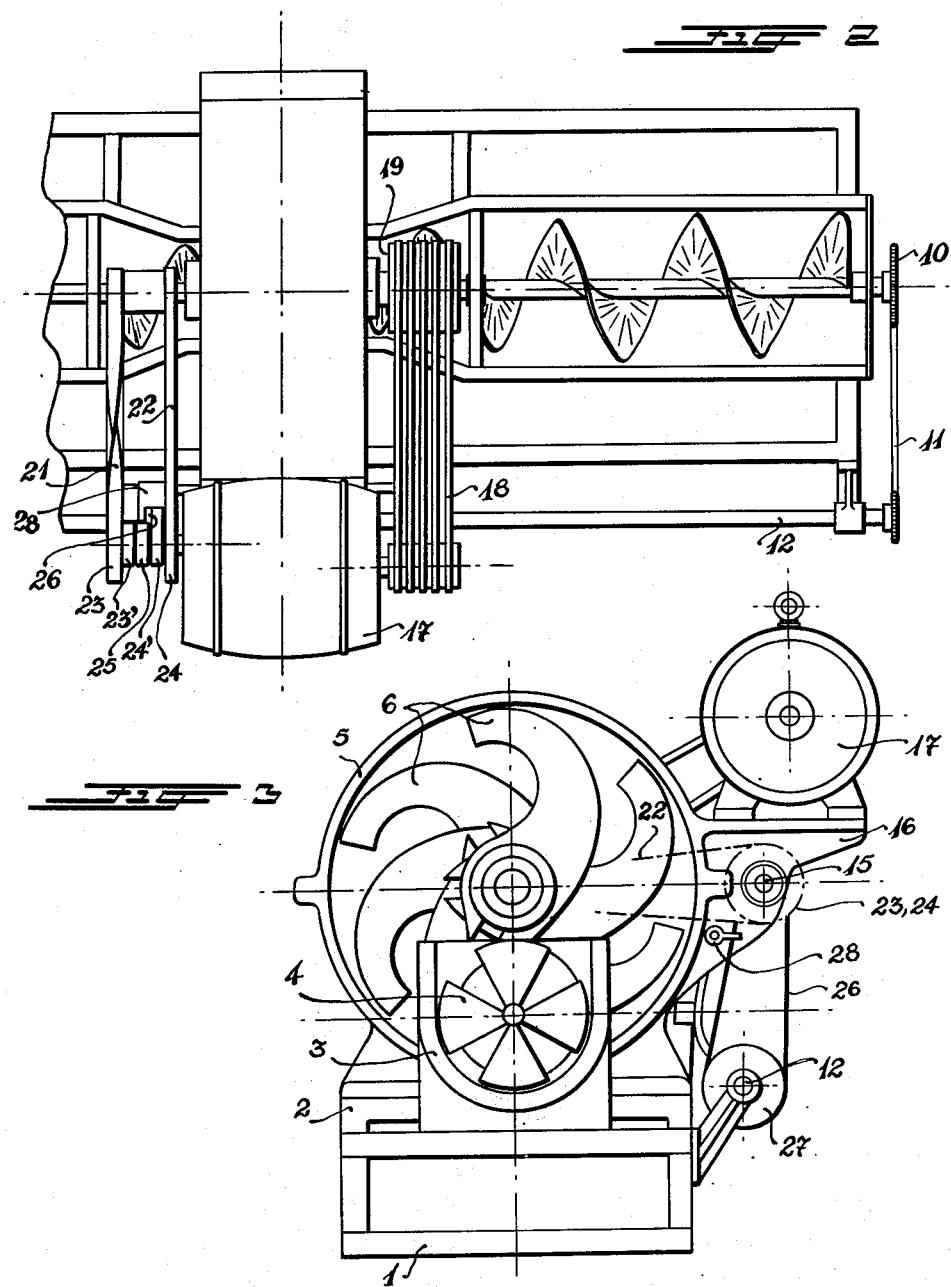
INVENTOR.
Adolfo Levit
BY Harry Ernest Rubens
ATTORNEY.

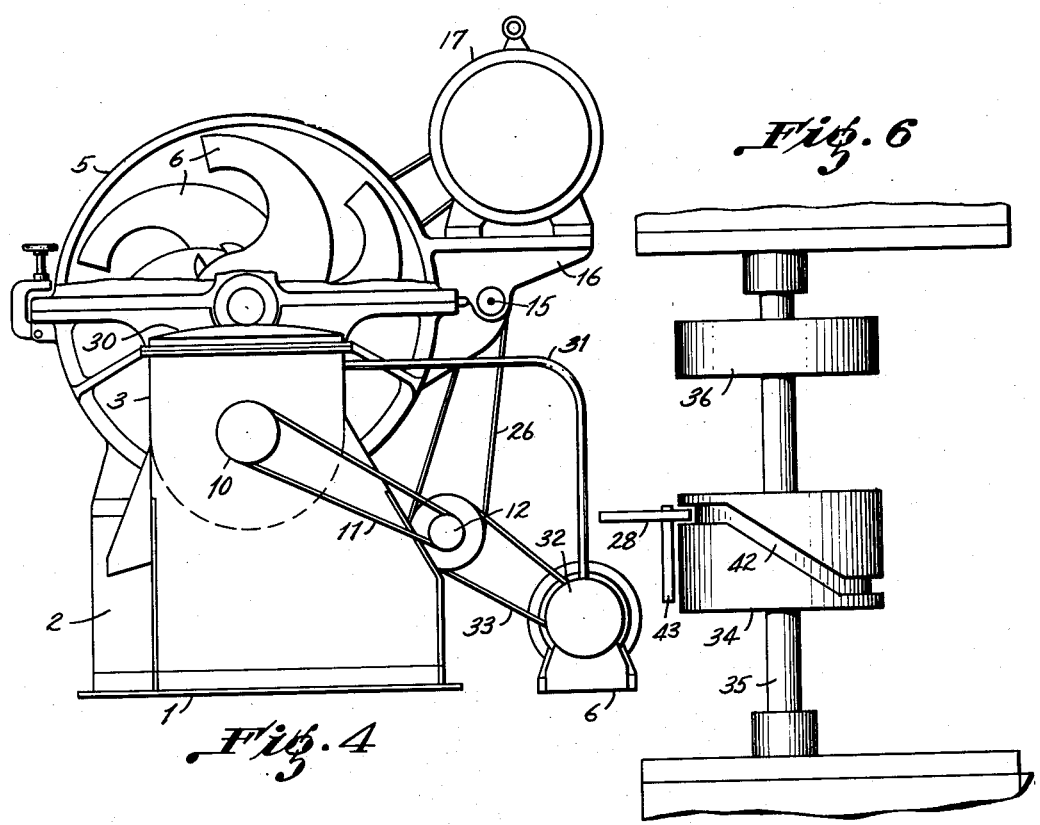
Fig. 6
Fig. 4
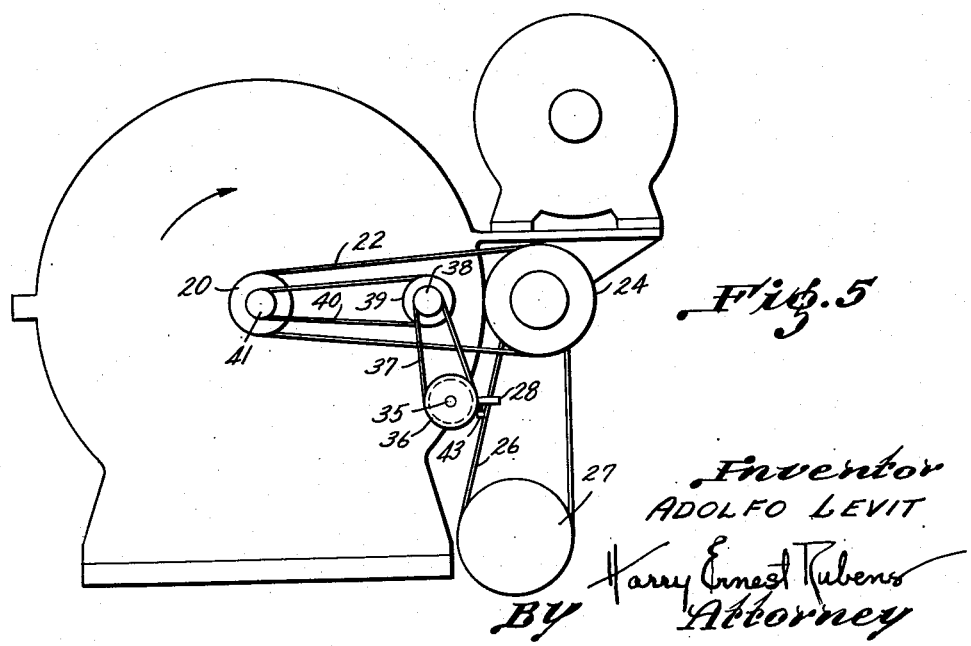
Fig. 5
Inventor
ADOLFO LEVIT
BY Harry Ernest Rubens
Attorney Patented Nov. 11, 1952

2,617,460

UNITED STATES PATENT OFFICE 2,617,460

MEAT-CUTTING MACHINE

Adolfo Levit, Buenos Aires, Argentina

Application July 1, 1949, Serial No. 102,543

5 Claims. (Cl. 146—67)

My present invention refers to a new meat-cutting machine and more particularly to a machine for cutting raw meat for the manufacture of sausages to be preserved without cooking, such as for instance the so-called salami, Mortadella, Bologna and like sausages.

In the preparation of raw meat sausages of the types referred to it is of vital importance for ensuring perfect flavour and color and good keeping qualities of the sausages, that: No heat be generated during the processing of the raw meat; the raw meat be cleanly cut and not crushed or squashed in order to preserve the natural meat juices; the formation of air pockets in the meat mass be avoided—which means that processing of the raw meat be carried out without application of any kind of pressure, without a beating action of the cutters, without undue friction caused by a very high speed of rotation of the cutters, and without unnecessary exposure to air.

Most of the known meat-processing machines do not comply with the aforementioned requirements or only comply with part thereof and are, therefore, absolutely unsuitable for obtaining good results in the manufacture of raw meat sausages with good keeping qualities. In the known machines, in general, the meat is subjected to strong pressure, so that a substantial amount of heat is generated and the meat is squashed to such a degree that the natural meat juices are not preserved therein. Both the heat and the grinding effect of the known machines render the meat unsuitable for sausages to be preserved without cooking.

As a matter of fact, there is at present no machine on the market capable of complying with all the requirements set forth and which in addition may be constructed at relatively low cost, but which nevertheless are efficient in operation and output.

My present invention aims at practically solving this problem in a simple, but efficient manner, and its main object is to provide an improved meat-cutting machine, more particularly destined for the manufacture of raw meat sausages to be preserved without cooking, in which the meat is moved without application of substantial pressure and without generation of heat by at least two co-axial conveyor means through a relatively slowly rotating cutting device arranged between said conveyer means, with the advantageous result that this improved machine complies with the requirement for a cool processing of the sausage meat.

Another object of my invention is to provide an improved meat-cutting machine, in which the two co-axial conveyor means are arranged in trough-like casings having one open end and directly communicating with the lower part of a cylindrical casing for housing the cutting device, this cylindrical casing having opposite openings in the side walls thereof for establishing the communication with said conveyor casings, the arrangement and construction of these casings being such that no squashing or grinding of the meat under treatment may occur, thereby ensuring the advantage that the natural meat juices are preserved and flavour and color of the meat are not affected.

Another important object of my invention is to provide an improved meat-cutting machine, comprising a central cylindrical casing for the cutting device and attached to each side of this casing a trough-like casing for the conveyor means, removable covers provided on the conveyor casings and means for hermetically closing all these casings, and a vacuum pump connected to the latter so that the meat-cutting machine may advantageously be operated under vacuum and the formation of air pockets in the sausage meat may be absolutely avoided.

Still another object of the invention is to provide an improved meat-cutting machine, in which the conveyor means in the trough-like casings and the cutting device in the cylindrical casing are so designed and arranged that the meat is handled and cut in a very uniform manner and without the formation of spots in the sausage meat.

An additional object of the invention is to provide an improved meat-cutting machine, in which the inner ends of the conveyor means slightly project into the cutter casing, with the advantageous result that the transport of the meat through the cutter casing is considerably expedited.

Another important object of the invention is to provide an improved meat-cutting machine, in which the conveyor means consist of screws having at least part of their length constructed as mixing screws formed by paddles in helicoidal arrangement, so that a mixing operation of the sausage meat may be effected simultaneously.

Still another not less important object of the present invention is to provide an improved meat-cutting machine, comprising a pair of co-axial conveyor means and a cutting device arranged between said conveyor means, and driving means for automatically operating said conveyor means alternatively in one and the other direction so as to move the meat to and fro through said cutting device.

A further object of my invention is to provide an improved meat-cutting machine, comprising pairs of co-axial conveyor means and cutting devices arranged between adjacent conveyor means, the number of said cutting devices being such that the meat is sufficiently cut in one passage through said cutting devices.

With these objects and advantageous features in view, the present invention comprises the combination, construction and arrangement of parts as will be hereinafter fully described with particular reference to the accompanying drawings which, by way of example only, show a preferred embodiment of my improved meat-cutting machine, and on which:

Figure 1 is a schematic view in longitudinal vertical section of the meat-cutter according to the invention, Figure 2 is a fragmentary plan view thereof, and Figure 3 is a cross section.

Fig. 4 is an end elevation of the machine showing the vacuum pump.

Fig. 5 is a fragmentary side view, and

Fig. 6 is a fragmentary plan view, both showing an embodiment of the automatic arrangement for inverting the direction of the conveyor screws for moving the meat through the cutting knives.

With reference to the accompanying drawings, on a suitable framework 1 having a reinforced central part 2, there are fixedly mounted a pair of trough-like casings 3, 3', each containing a conveyor screw 4 and 4', respectively, and a cylindrical casing 5 containing the cutting device formed by a variable number of sickle-shaped knives 6.

The conveyor means 4, 4' may be simple screws each formed by a helicoidal blade as shown in Figure 2, but they may be constructed at least in part as mixing screws formed by paddles in helicoidal arrangement as illustrated in Figure 1; however, in this latter case, the inner end portions 4'' must be for all events full helicoidal blades as shown for efficiently moving the meat into and out of the casing 5.

The free ends of the conveyor screws 4, 4' suitably extend through the openings 7 provided in the side walls of the cylindrical casing 5 and slightly project into the interior of this casing, so that the operation of moving the meat through the cutter casing is greatly expedited without any substantial pressure on the meat being required.

The conveyors 4, 4' are rotatively mounted in suitable bearings 9 provided with air and liquid-tight packings (not shown), and are provided at their outer projecting ends with chain wheels 10 so that they may be driven by means of chains 11 from a common shaft 12. The operation of the conveyors is such that they rotate alternatively in one and the other direction, in order to move the meat introduced e. g. into the casing 3 through the casing 5 into the casing 3' and from the latter back to the casing 3 and so several times to and fro until the meat being sufficiently cut by the knives 6.

The sickle-shaped knives 6 are removably mounted on the shaft 13 and are separated from each other by suitable spacing washers or like elements, the number of knives being variable according to the sausage type to be produced. The shaft 13 is removably mounted in bearings 14 in the side walls of the cylindrical casing 5.

This casing is made of two halves, of which the upper one may be swung around a hinge shaft 15, this upper casing portion forming part of the bracket 16 for the electric motor 17 (see Figure 3) in such an arrangement that the bracket 16 and motor 17 constitute a counterweight and facilitate opening of the casing 5.

The motor 17 operates the cutter 6 by means of V belts 18 and the corresponding pulley 19 (Fig. 2).

The shaft 13 at its end opposite to that of the pulley 19 carries a double pulley 20 for two belts 21 and 22, of which the first one is crossed so as to operate the pulley 23 in a direction opposite to that of the pulley 24 driven by the belt 22. The two pulleys 23 and 24 are coupled with or form integral parts of the pulleys 23' and 24', respectively, which are separated from each other by another pulley 25. All these pulleys are loosely mounted on the aforementioned hinge shaft 15, and on the pulleys 23', 25, 24' which are of the same diameter, a belt 26 is displaceable to alternatively connect the pulley 23' or 24' with a pulley 27 provided on the shaft 12 and to rotate this shaft and through the chains 11 and chain wheels 10 the conveyors 4, 4' in one and the other direction, the displacement of the belt 26 being periodically effected automatically by means of a suitable device 28, of which only parts have been shown in Figures 2 and 3, because such devices are well known and used e. g. in planing machines. Figures 5 and 6 are schematic fragmentary side and plan views, respectively, showing an embodiment of the automatic arrangement for inverting the direction of rotation of the shaft 12 and thereby of the conveyor screws 4, 4', by moving in one and the opposite direction the pin 28 whereby the belt 26 is alternately moved from the pulley 23' over the pulley 25 to the pulley 24', said pin 28 being operated by a guide drum 34 mounted on the shaft 35 of a pulley 36 which by means of a belt 37, pulley 38, pulley 39 and belt 40 and pulley 41 are driven from the shaft 13 of the cutting device, and said guide drum 34 comprise a circumferential guide groove 42 engaged by the pin 28 which is slidably mounted on a rail 43 or the like in such a manner that when the drum 34 rotates, the pin 28 following the guide groove 41 will move to and fro thereby displacing alternately the belt 26 as desired. This device is so adjusted that it changes the direction of rotation of the conveyors each time a load of meat has been moved from one conveyor to the other i. e. from one side of the cutting device to the opposite side thereof.

Instead of the pulleys 20, 23, 24 and of the belts 21 and 22, chain transmission means may be used.

The conveyor casings 3, 3' are provided at their free ends with discharge ports 29 and their open tops may be closed by air-tight covers (not shown). The cutter casing 5 is conveniently so constructed that the same also may be closed hermetically, so that if these casings are connected to a vacuum pump as shown in Fig. 4, wherein each casing 3 is provided with an hermetically sealed cover 30 and is connected by means of a pipe 31 to a vacuum pump 32 driven by a belt 33 from the shaft 12, in case the latter rotates in one direction only, otherwise the vacuum pump has to be operatively connected to the motor 17, or may be driven independently by a separate motor. Machine may be advantageously operated under vacuum in order to absolutely avoid the formation of air pockets in the sausage meat.

Instead of comprising two conveyors 4, 4' and one cutter 6, the improved meat-cutting machine according to my invention, may comprise a series of co-axial conveyors and a cutting device between the adjacent ends of the successive conveyors. In this case, the discharge ports 29 are arranged laterally near one end of the conveyor casings.

The operation of the improved meat-cutting machine, according to this invention, is very simple: The meat to be cut is charged into any of the two casings 3, 3' and the motor 17 is switched on, which drives the cutter 6 and the conveyors 4, 4' as hereinbefore described. These conveyors rotating alternatively in one and the other direction move the meat to and fro through the cutter casing 5, wherein the same is cut during each passage. It is advantageous that in this improved machine only a relatively small quantity of meat is at any time to be treated by the knives and that cutting is effected only in the lower portion of the cutter casing. The knives may thus advantageously be cleaned while they rotate through the upper portion of said casing. Suitable devices for this purpose are quite known and may be conveniently and suitably secured to the inner surface of the upper casing portion.

The operation of the machine is continued until the meat be sufficiently cut, whereupon one of the ports 29 is opened and the sausage meat is discharged by the respective conveyor screw. During this discharge of the sausage meat from one end of the machine, fresh meat may be introduced into the machine at the opposite end, so that operation of the machine is practically continuous.

In case the machine comprises a series of conveyors and cutters in co-axial arrangement, meat processing is entirely continuous, because the meat is continuously introduced at one end and is continuously discharged at the other end or after any of the cutters provided the preceding ones have sufficiently cut the meat.

Finally it may be mentioned that the knives of the improved machine according to this invention rotate at a speed of about 700 R. P. M. only as compared with about 1200 to 2400 R. P. M. of the cutters of the known machines.

It will be understood that the present invention is by no means restricted to the embodiment as hereinbefore described and as shown on the accompanying drawings, but that alterations, amendments and modifications may be made therein in as far as minor constructive details are concerned, and that such amendments are to be considered as falling within the scope of the appended claims.

What I claim and desire to secure by Letters Patent is:

1. Meat-cutting machine, comprising at least one cutting device having a plurality of cutting knives, at least two co-axial conveyor means, one at each side of said cutting device for successively moving the meat through said cutting device, and driving means for operating said cutting device continuously in one direction and the conveyor means alternatively in one and the other direction to move the meat to and fro through said cutting device.

2. Meat-cutting machine, comprising a central casing for containing a rotative cutting device having a plurality of cutting knives, two co-axial conveyor means, one at each side of said central casing, for moving the meat through said central casing and subjecting it to the action of said rotative cutting device, and driving means for operating said cutting device continuously in one direction and the conveyor means alternatively in one and the other direction to move the meat to and fro through said central casing.

3. Meat-cutting machine, comprising a central cylindrical casing for containing a rotative cutting device having a plurality of cutting knives mounted on a horizontal shaft co-axial to the axis of said cylindrical casing; opposite openings in the lower part of the side walls of said cylindrical casing for communicating said cutting device with a pair of trough-like casings, one projecting from each side of said cylindrical casing; a pair of co-axial conveyor means, one in each of said trough-like casings, for moving the meat through said cylindrical casing and subjecting it to the action of said rotative cutting device; and driving means for operating said cutting device continuously in one direction and the conveyor means alternatively in one and the other direction to move the meat to and fro through said cylindrical casing.

4. Meat-cutting machine, comprising a central cylindrical casing for containing a rotative cutting device having a plurality of cutting knives mounted on a horizontal shaft co-axial to the axis of said cylindrical casing, opposite openings in the lower part of the side walls of said cylindrical casing for communicating the lower part of said cutting device with a pair of trough-like casings co-axially arranged one at each side of said cylindrical casing; a pair of co-axial conveyor screws arranged one in each of said trough-like casings so as to extend through said openings and to slightly project into said cylindrical casing, for moving the meat through said cutting device and subjecting it to the action of the cutting device therein; and driving means for operating said cutting device continuously in one direction and the conveyor means alternatively in one and the other direction to move the meat to and fro through said cylindrical casing.

5. Meat-cutting machine, comprising a central cylindrical casing for containing a rotative cutting device having a plurality of cutting knives mounted on a horizontal shaft co-axial to the axis of said cylindrical casing, opposite openings in the lower part of the side walls of said cylindrical casing for communicating the lower part of said cutting device with a pair of trough-like casings co-axially arranged one at each side of said cylindrical casing; a pair of co-axial conveyor screws in part constructed as mixing screws and arranged one in each of said trough-like casings so as to extend through said openings and to slightly project into said cylindrical casing, for moving the meat through said cutting device and subjecting it to the action of the cutting device therein; and driving means for operating said cutting device continuously in one direction and the conveyor screws alternatively in one and the other direction to move the meat to and fro through said cylindrical casing.

ADOLFO LEVIT.

REFERENCES CITED

The following references are of record in the file of this patent:

UNITED STATES PATENTS

| Number | Name | Date |
|---|---|---|
| 97,041 | Burghardt | Nov. 23, 1869 |
| 1,488,250 | Hottmann | Mar. 25, 1924 |
| 2,078,565 | Durst et al. | Apr. 27, 1937 |
| 2,229,845 | Gold | Jan. 28, 1941 |
| 2,272,629 | Arthur | Feb. 10, 1942 |
| 2,390,680 | Ausherman | Dec. 11, 1945 |